(12) United States Patent
Kim et al.

(10) Patent No.: US 6,598,563 B2
(45) Date of Patent: Jul. 29, 2003

(54) PET TRAINING DEVICE

(75) Inventors: J. S. Kim, Dallas, TX (US); Gi Hyun Lee, Incheon (KR); Dong Joo Lee, Seoul (KR)

(73) Assignee: D.T. Systems, Inc., Dallas, TX (US)

( * ) Notice: Subject to any disclaimer, the term of this patent is extended or adjusted under 35 U.S.C. 154(b) by 0 days.

(21) Appl. No.: 10/207,927

(22) Filed: Jul. 30, 2002

(65) Prior Publication Data

US 2003/0116101 A1 Jun. 26, 2003

(30) Foreign Application Priority Data

Dec. 21, 2001 (KR) .................... 2001-0082740

(51) Int. Cl.[7] .............................. A01K 27/00
(52) U.S. Cl. ...................... 119/720; 119/719
(58) Field of Search ................ 119/712, 718, 119/719, 720, 856, 859, 862

(56) References Cited

U.S. PATENT DOCUMENTS

| | | |
|---|---|---|
| 3,589,337 A | 6/1971 | Doss |
| 3,673,567 A | 6/1972 | McClellan, Sr. |
| 3,823,691 A | 7/1974 | Morgan |
| 4,180,013 A | 12/1979 | Smith |
| 4,335,682 A | 6/1982 | Gonda |
| 4,881,148 A | 11/1989 | Lambropoulos |
| 4,887,549 A | 12/1989 | Powell |
| 4,956,795 A | 9/1990 | Yamaguchi |
| 5,041,969 A | 8/1991 | Kawasaki |
| 5,109,221 A | 4/1992 | Lambropoulos |
| 5,353,744 A | 10/1994 | Custer |
| 5,465,687 A | 11/1995 | Custer |
| 5,559,498 A | 9/1996 | Westrick |
| 5,601,054 A | 2/1997 | So |
| 5,605,116 A | 2/1997 | Kim |
| 5,666,908 A | 9/1997 | So |
| 5,749,324 A | 5/1998 | Moore |
| 5,769,032 A | 6/1998 | Yarnall, Sr. |
| 5,815,077 A | 9/1998 | Christiansen |
| 5,857,433 A | * 1/1999 | Files ................ 119/720 |
| 5,868,103 A | * 2/1999 | Boyd ................ 119/719 |
| 5,913,284 A | 6/1999 | Van Curen |
| 6,003,474 A | * 12/1999 | Slater et al. ........ 119/859 |
| 6,005,508 A | 12/1999 | Tsui |
| 6,019,066 A | 2/2000 | Taylor |
| 6,047,664 A | 4/2000 | Lyerly |
| 6,079,367 A | 6/2000 | Stapelfeld |
| 6,131,535 A | 10/2000 | So |
| 6,135,060 A | 10/2000 | So |
| 6,167,843 B1 | 1/2001 | Kim |
| 6,170,439 B1 | * 1/2001 | Duncan et al. ...... 119/720 |
| D444,405 S | 7/2001 | So |

FOREIGN PATENT DOCUMENTS

| | | |
|---|---|---|
| JP | 2308737 | 12/1990 |
| JP | 9103206 | 4/1997 |
| WO | WO 95/00009 | 1/1995 |

* cited by examiner

*Primary Examiner*—Peter M. Poon
*Assistant Examiner*—Son T. Nguyen
(74) *Attorney, Agent, or Firm*—Garlick Harrison & Merkison; James Harrison

(57) ABSTRACT

A pet training device comprises a wireless command module, a wireless receiver module connected to an adjustable collar assembly. The wireless command module is used to select a stimulation mode, a stimulation duration, and a stimulation intensity level through the use of one-touch digital switches located on the wireless training device front panel. The selected functions are displayed on an LCD. Stimulation commands are transmitted to the wireless receiver module where they are demodulated into control signals that trigger a shock, a vibration, or a shock and vibration. When the wireless receiver module is placed in a no-bark mode, the wireless receiver module will generate a shock when triggered by a bark sensor. Power controllers built into both the wireless command module and wireless receiver module optimizes battery life by turning the training devices off after a period of inactivity.

24 Claims, 16 Drawing Sheets

Wireless command module

Wireless receiver module attached to collar

Wireless command module

Wireless receiver module attached to collar

Wireless command module

Transmission Message

Wireless receiver module

LCD Display

Wireless Command Module

Wireless Command Module

Wireless Receiver Module

Wireless Receiver Module

Shock Module 316

Vibrate Module 320

No-bark Module 324

Sealing belt

Receiver Module Method Flow Chart

Receiver Module Method Flow Chart

Wireless Command Module Method Flow Chart

PET TRAINING DEVICE

CROSS-REFERENCE TO RELATED APPLICATIONS

This application claims priority to and incorporates by reference the Foreign Patent Application having a translated title of, "Apparatus for Animal Training and for the Prevention of Barking", by the inventors Joon Soo Kim, Ki H. Lee, and Dong J. Lee, having an application number of PATENT-2001-0082740 and a filing date of Dec. 21, 2001.

BACKGROUND OF THE INVENTION

1. Technical Field of the Invention

This invention relates generally to an apparatus and a method for animal behavior modification and, more particularly, to an apparatus and a method for animal training and for the prevention of barking.

2. Description of the Related Art

Animals exhibiting undesirable behavior, such as barking excessively and damaging possessions, typically require behavior modification. Undesirable behavior such as excessive barking is not only irritating to family and neighbors but, in some municipalities, is a violation of city ordinance punishable by fines or removal of the offending animal. Disobedient dog, for example, present a wide range of potential problems both legal and financial. It is desirable, therefore, to train the offending animal by modifying the undesirable behavior.

Typical training includes remote electrical stimulation during the undesirable behavior in order to discourage the animal. Electrical stimulation can be a shock, a vibration, or a combination of both, usually accomplished by attaching a shock and vibration device to the animal by way of a collar. The electrical stimulation can be set to a low level then increased until the behavior modification is accomplished. Conventional training devices use a transmitter with analog controls to set a stimulation mode and level then send the stimulation information via a radio wave to a receiver. The receiver converts the radio waves into signals that will activate the shock and vibration devices.

A number of problems exist with analog controls. The first problem is that the analog controls are difficult to set accurately. A second problem with analog controls is that, once set, the setting can be too easily changed by accidentally touching the control. A third problem with analog controls is that they are typically "power hungry" devices, meaning they consume a great deal of power. This is a considerable problem with battery-operated devices. A significant problem with conventional training devices is the absence of a display to provide information to the user. The trainer has to manually check the position of the analog controls to verify the settings.

In order to modify behavior, the person performs the training with a remote controlled training device. Often, however, a dog barks when no-one is around.

There is a need in the art, therefore, for a device that combines a stimulator function (requiring human activated controls) and a no-bark function (not requiring human interaction) in a single device. Additionally, there is a need to provide feedback to the user while extending battery life by eliminating analog controls.

BRIEF SUMMARY OF THE INVENTION

The wireless training device comprises a handheld wireless command module and a wireless receiver module connected to an adjustable collar assembly. The wireless command module is used to select a stimulation mode, a stimulation duration, and a stimulation intensity level through the use of one-touch digital switches located on the device front panel. The selected functions are displayed on an LCD screen, which provides convenient confirmation of the training program. The stimulation commands are transmitted to the wireless receiver module attached to the animal with an adjustable collar. The adjustable collar maintains the vibration motor and shock electrodes in close proximity to the animal's vocal cords. The transmitted stimulation commands are demodulated by the receiver module into control signals that trigger a shock, a vibration, or a shock and vibration. When the wireless receiver is placed in the no-bark mode, the wireless receiver module will generate a shock when triggered by a bark sensor. Power controllers built into both the wireless command module and wireless receiver module optimizes battery life by turning the devices off after a period of inactivity.

Other features and advantages of the present invention will become apparent from the following detailed description of the invention made with reference to the accompanying drawings.

These and other features, aspects and advantages of the present invention will be more fully understood when considered with respect to the following detailed description, appended claims and accompanying drawings wherein:

DETAILED DESCRIPTION OF THE INVENTION

Figure 1:
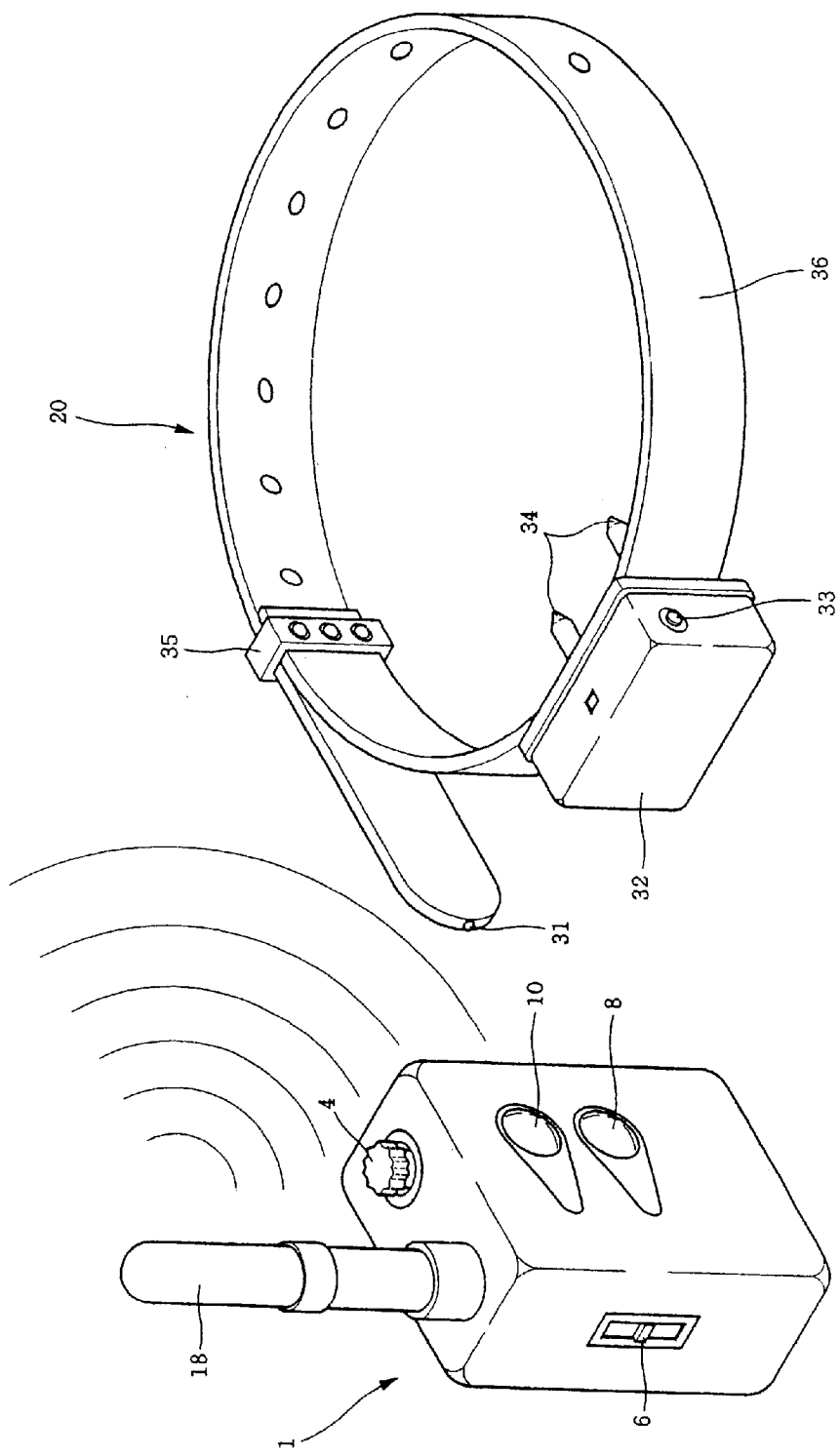
FIG. 1 is a perspective view of a prior art conventional animal training device.

FIG. 1 is a perspective view of a prior art conventional animal training device. A transmitter shown generally at 1 transmits commands via an antenna 18 to a receiver shown generally at 20, the receiver comprising a collar 36 with a buckle 35, an embedded antenna 31, a signal generator 32, and a pair of electrodes 34. The stimulation mode is selected by a 3-position mode selector switch 6, while the intensity level is adjusted by an analog intensity dial 4. Once the mode and intensity level has been selected, a trainer selects an instantaneous shock (nick) by pressing an instantaneous button 8 or a continuous shock by pressing a constant button 10. The instantaneous shock will stimulate the animal for approximately 0.4 seconds. The continuous shock lasts as long as the trainer presses the constant button 10.

When the instantaneous button 8 or constant button 10 is pressed, a microprocessor (not shown) generates control signals that are provided to the modulator for conversion into radio waves for transmission by antenna 18.

Figure 2:
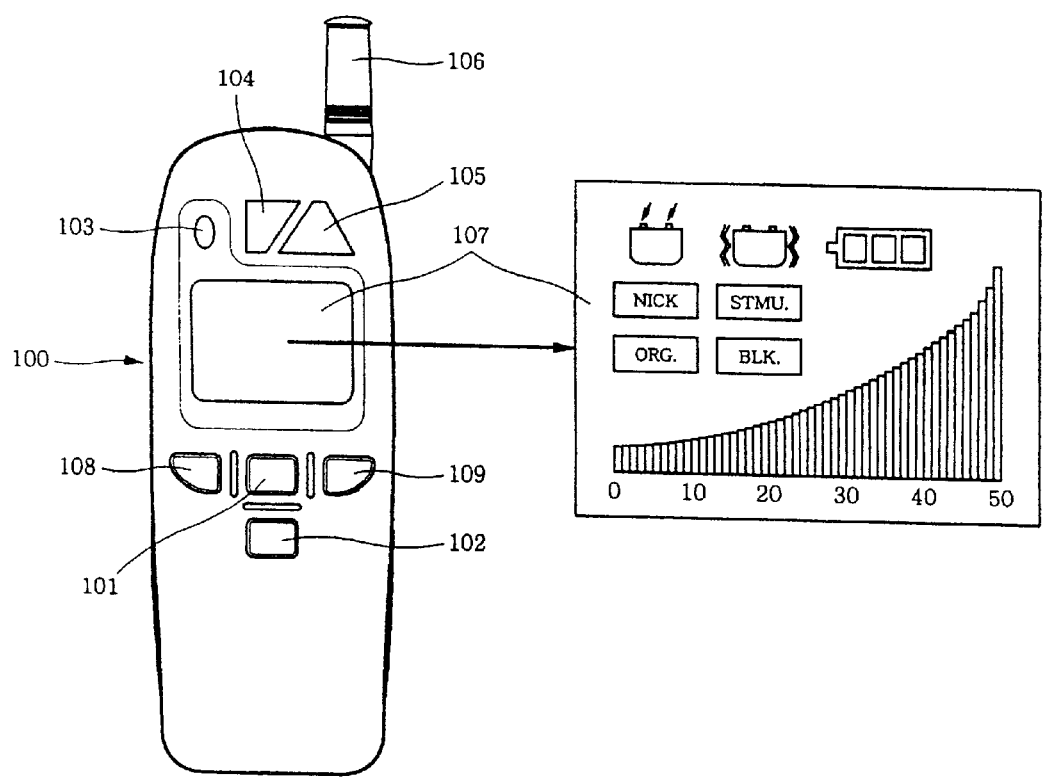
FIG. 2 is an illustration of a wireless command module according to one embodiment of the present invention.

FIG. 2 is an illustration of a wireless command module 100 according to one embodiment of the present invention. Also shown is an enlargement of a liquid crystal display (LCD) 107 for displaying shock wave status, the intensity level of the shock wave, type of stimulation (shock and/or vibration), the selected receiver, and the battery status.

Receiver selection is accomplished by pressing a receiver selection switch 103. In the present embodiment, two receivers are designated ORG and BLK. Alternate embodiments include multiple receivers designated by sequential numbers or letters. The method of addressing the receivers will be discussed with reference to the figures which follow. The shock wave level is increased by pressing a level increase switch 105, while shock wave level is decreased by pressing a level decrease switch 104. Pressing either level increase switch 105 or level decrease switch 104 will also increment or decrement a digital bar graph by one. Continuously pressing level switches 104 or 105 will continuously increase or decrease the shock wave level and the bar graph by one. Once the desired shock wave level is set, the mode of operation (shock, vibrate, no-bark, or a combination thereof) is controlled by pressing one of a plurality of mode switches 101, 102, 108, and 109. Vibrate output switch 108 selects a vibrate only mode, while vibrate and shock output switch 109 selects vibrate and shock. Shock only mode is selected by continuous output switch 102 or instant output switch 101.

Figure 3:
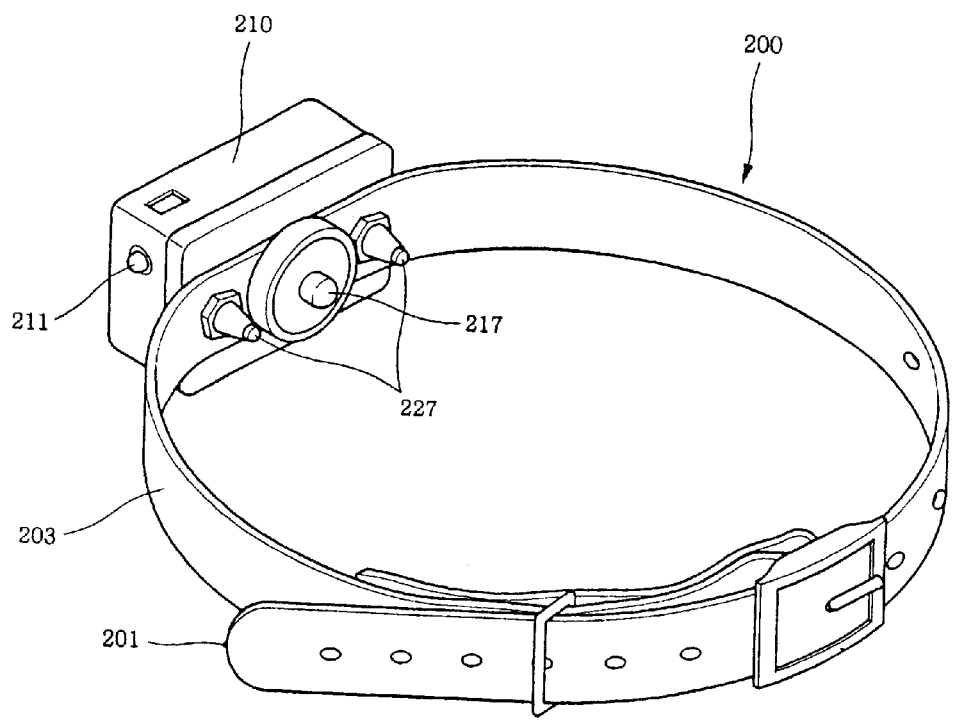
FIG. 3 is a perspective view of a receiver in one embodiment of the present invention.

FIG. 3 is a perspective view of a receiver in one embodiment of the present invention. The receiver, shown generally at 200, comprises a signal generator (wireless receiver module) 210 attached to an adjustable collar assembly 203, which contains an embedded receiving antenna 201. Adjustable collar assembly 203 maintains a pair of electrodes 227 and a barking sensor vibrator 217 in contact with the animal. A power switch 211 provides power to the receiver components and, upon receipt of a shut-down command from the microprocessor, turns the power off.

Figure 4:
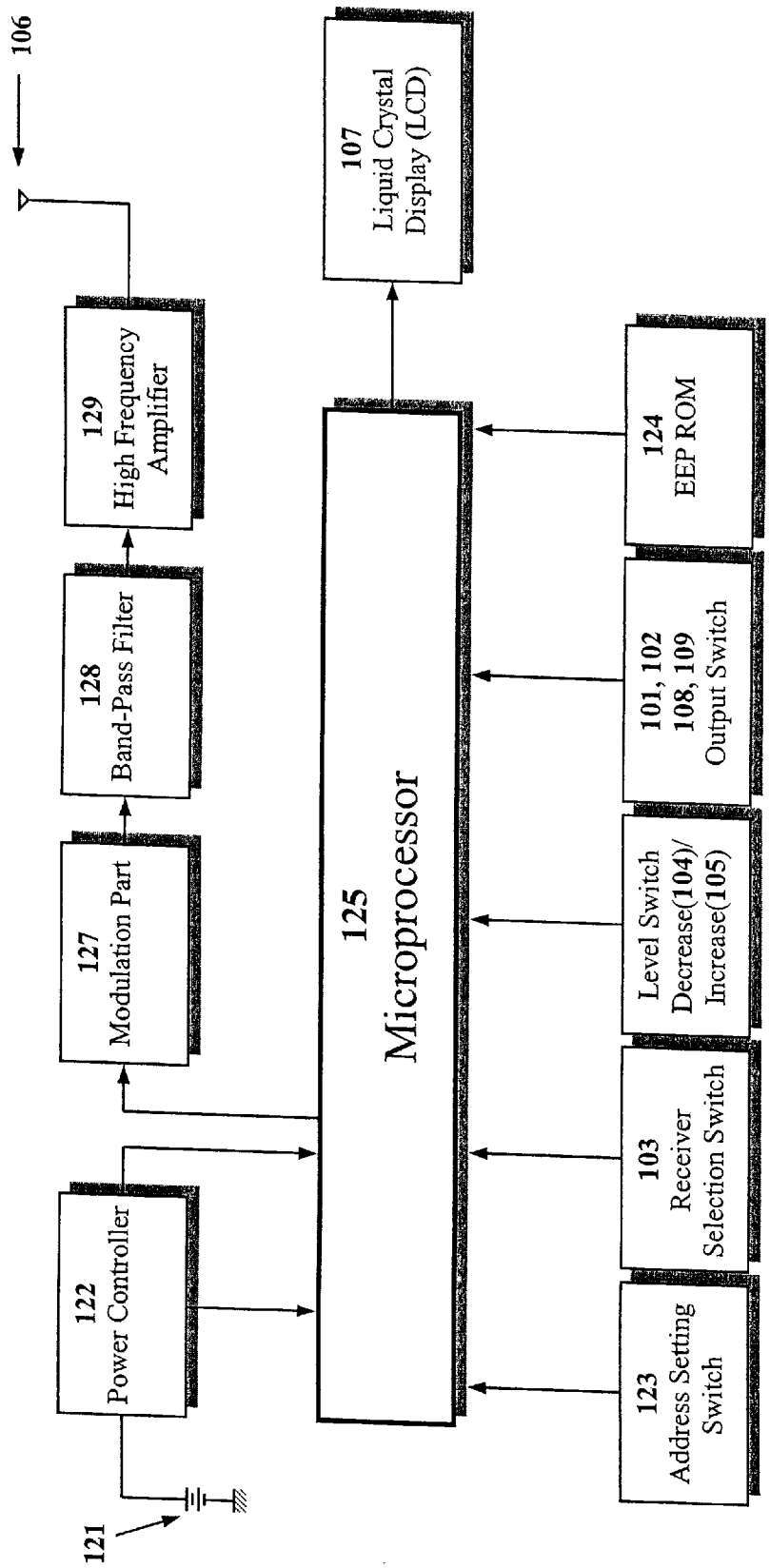
FIG. 4 is a block diagram of a wireless command module according to one embodiment of the present invention.

FIG. 4 is a block diagram of a wireless command module according to one embodiment of the present invention. A battery 121 provides unregulated voltage to a power controller 122, which provides regulated voltage to the wireless command module components and shuts off power to the transmitter components upon receipt of a shut-down command. A microprocessor 125 controls operation of the transmitter, generates control signals responsive to a plurality of switches, formats the control signals for transmission, and displays the operating mode on LCD 107. The microprocessor function may be implemented in various methods, such as operational logic formed in a field programmable gate array (FPGA) or may be integrated with other functions on an application specific integrated circuit (ASIC). Memory device EEP ROM 124 stores the various operating instructions, the stimulation level, and the microprocessor algorithm. EEP ROM 124 may be implemented in various forms such as non-volatile flash memory. Additionally, EEP ROM 124 may be external to the microprocessor 125, as shown in FIG. 4, or may be formed on the integrated circuit with the processor function.

Upon application of power, the microprocessor 125 performs a power-on self test (POST), initializes the transmitter, initializes an inactivity timer, reads the settings of the plurality of switches then reads the previously stored function and intensity level from EEP ROM 124. After reading the addresses defined by an address setting switch 123, microprocessor 125 stores the addresses in EEP ROM 124. In one embodiment of the invention, the addresses defined by address setting switch 123 are set manually by a plurality of dual inline package (DIP) switches. In an alternate embodiment, each address is programmable to allow the user to add addresses as needed.

In an alternate embodiment, the transmitter always sends out a specific address for the selected receiver. In this embodiment, the receiver has a plurality of DIP switches to set the receiver address to match the transmitter address.

After initialization, microprocessor 125 displays the receiver selection, function, and intensity level on LCD 107. Additionally battery status is displayed and continuously updated. At this point, the microprocessor 125 waits for the user to press an output switch: instantaneous output switch 101, continuous output switch 102, vibrate output switch 108 or vibrate and shock output switch 109. Once an output switch is pressed, microprocessor 125 generates a formatted transmission message containing the stimulation mode, stimulation intensity level, stimulation duration, and receiver address for processing by a modulation part 127.

Modulation part 127 generates an RF oscillation modulated with the transmission message. The modulated RF oscillation is then filtered by a band-pass filter 128 to remove harmonics and spurious signals outside the desired RF bandwidth. The filtered and modulated RF signal is amplified by a high frequency amplifier 129 for transmission by transmitting antenna 106.

Figure 5:
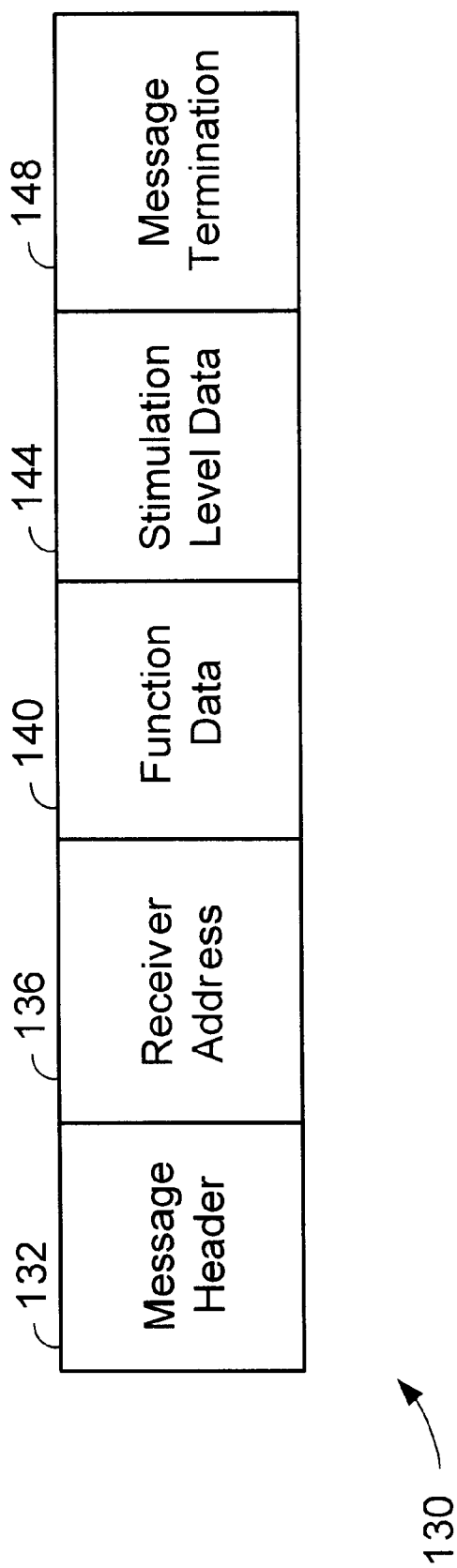
FIG. 5 is a diagram of a transmission message generated by a microprocessor.

FIG. 5 is a diagram of the formatted transmission message, shown generally at 130, generated by the microprocessor. A message header 132 contains a binary pattern to identify the start of a signal. A receiver address 136 contains the receiver address that identifies a specific receiver from a plurality of receivers. In one embodiment, the address of the receiver is received by the microprocessor as set by a plurality of DIP switches. Thus, according to a selected receiver, the microprocessor returns a previously specified corresponding address and inserts the address into receiver address 136. A function data 140 defines the desired stimulation: vibrate, vibrate and shock, instant shock, and continuous shock. In one embodiment, a no-bark function is also specified wherein the receiver module responds with a specified function whenever barking is detected. A stimulation level data 144 contains the desired shock level. A message termination 148 contains binary data that signifies the end of the message. In an alternate embodiment, the duration of the stimulation (i.e., shock and vibrate) is programmable. In this embodiment, the transmission message will contain a duration data part to define the length of stimulation. The length of the transmission message can be extended to accommodate added functionality of alternate embodiments.

Figure 6:
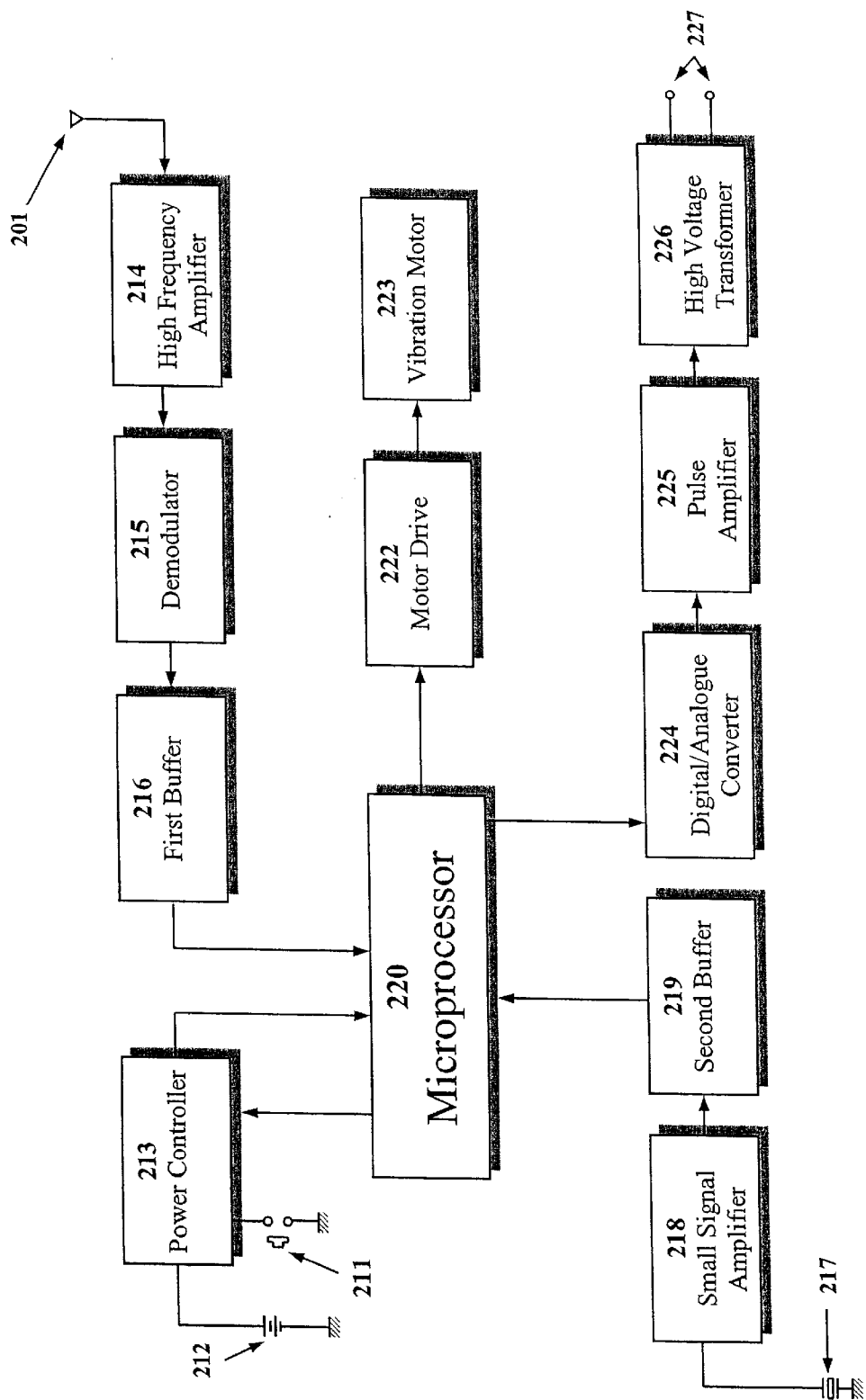
FIG. 6 is a block diagram of a wireless receiver module according to one embodiment of the present invention.

FIG. 6 is a block diagram of a wireless receiver module according to one embodiment of the present invention. A power switch 211 connects a battery 212 to a power controller 213 which regulates the battery voltage and provides a power off function upon receipt of a shut-down command from a microprocessor 220 generated as the result of the expiration of an inactivity timer.

Receiving antenna 201 couples the low level modulated RF signal to a high frequency amplifier 214 which amplifies the low level modulated RF signal to a level suitable for a demodulator 215. Demodulator 215 separates the transmission message from the RF oscillation and provides the transmission message to a first buffer 216. First buffer 216 forms the formatted transmission message into a digital format that can be read by microprocessor 220.

Microprocessor 220 controls operation of the wireless receiver module by decoding the digital data received from first buffer 216 to determine if the receiver address matches the internal address. Microprocessor 220 discards the decoded digital data if the receiver address does not match the internal address. If the receiver address is correct, then the function data and stimulation level data are processed and the appropriate stimulation module is activated. If the selected stimulation mode is vibrate, then the microprocessor provides a vibrate control signal to a motor drive 222 which converts the digital vibrate control signal into a waveform suitable for driving a vibration motor 223.

When the stimulation mode is shock, microprocessor 220 provides a shock control signal to a digital-to-analog converter 224 which will convert the digital data into an analog shock waveform. The shock analog waveform is amplified to a predetermined level by a pulse amplifier 225 before being coupled to a high-voltage transformer 226 wherein the shock analog waveform is boosted to a level sufficient to cause a shock. The output of the high-voltage transformer is coupled to a pair of shock electrodes 227 which couple the shock analog waveform to the animal.

An operating mode switch (not shown) defines two modes of operation: training and bark prevention. In the bark prevention, i.e., no-bark mode, a bark sensor 217 generates a small signal responsive to the barking. A small signal amplifier 218 amplifies the small signal to a higher level that can be converted to digital data by a second buffer 219. The output of second buffer 219 is coupled to microprocessor 220, which analyzes the digital data to determine if the animal barked. If the analysis is positive, wherein the animal did indeed bark, the microprocessor sends a shock control signal which causes a shock in the manner previously described. The no-bark mode, in the present embodiment, will generate a shock at the onset of barking. In an alternate embodiment, a barking threshold is envisioned such that a programmable level of barking is allowable, but once that programmable level is exceeded the microprocessor sends a shock control signal thereby generating the shock. Another embodiment provides for the selection of shock, vibrate, or both, when the no-bark mode is selected.

When the operating mode switch is set to the training mode, the microprocessor operates according to commands received from the transmitter as previously described.

In an alternate embodiment, the operating mode switch is replaced by a software function wherein a function key on the wireless command module changes the operating mode. The operating mode status is included as an additional data packet in the formatted transmission message.

Figure 7:
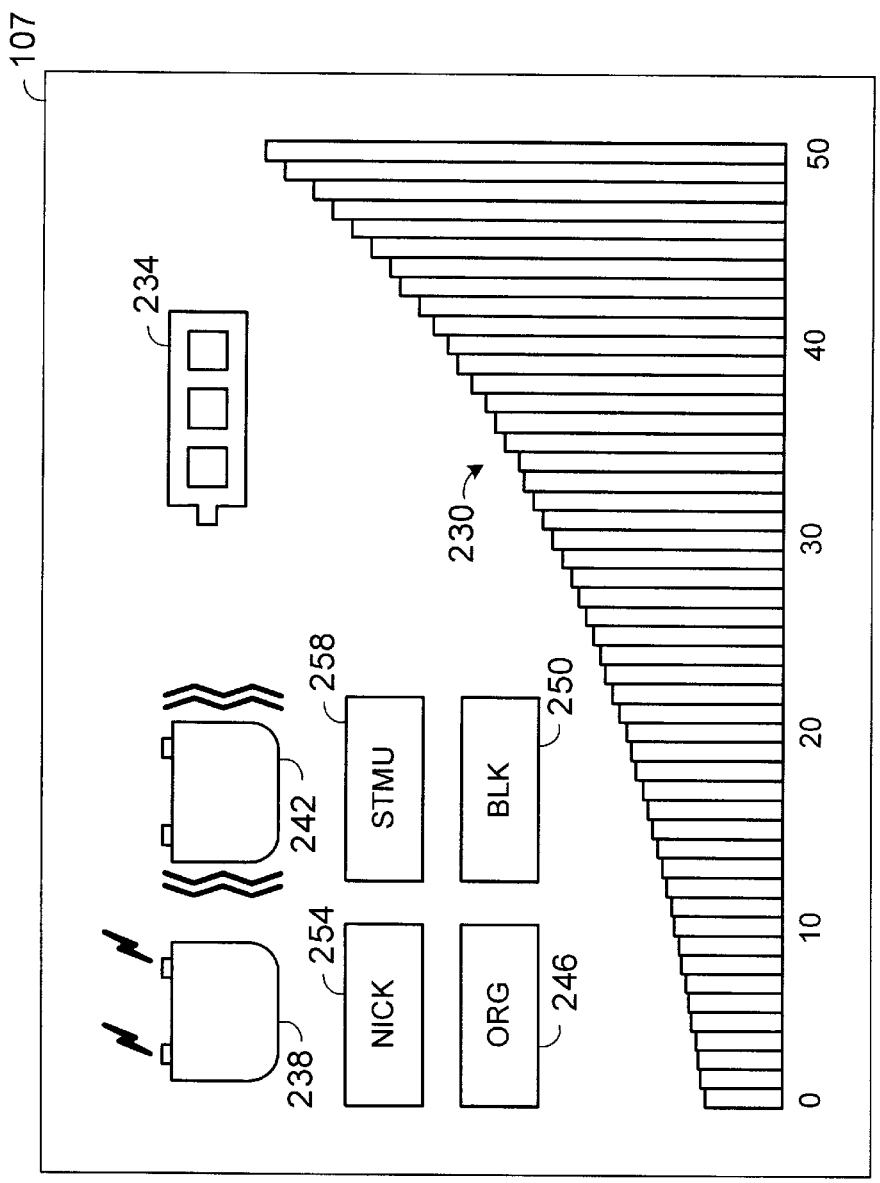
FIG. 7 is an illustration of the liquid crystal display (LCD) in one embodiment of the present invention.

FIG. 7 is an illustration of the liquid crystal display (LCD) 107 of one embodiment of the present invention. An intensity level bar graph 230 shows the selected intensity level. As level decrease switch 104 and level increase switch 105 of FIG. 2 are pressed, the bar graph level decreases or increases, respectively. A battery status 234 indicates the estimated residual battery power. Graphical symbols 238 and 242 indicate the selected stimulation mode according to the mode selected by output mode switches 108 and 109 of FIG. 2. Graphical symbol 238 indicates the shock mode has been selected while symbol 242 indicates the vibrate mode has been selected. When the shock and vibrate mode is selected, both graphical symbols 238 and 242 will be on. Receiver selection is indicated by symbols 246 and 250. Symbol 246, ORG, indicates that a primary receiver is selected, while symbol 250, BLK, indicates a secondary receiver has been selected. In an alternate embodiment, the ORG and BLK could be replaced by a plurality of alphanumeric symbols to allow animal names to be programmed into the display. Using this method, the trainer could more easily identify the selected receiver. Symbols 254 and 258 illuminate for a brief period during message transmission to verify the transmission is underway. Symbol 254, NICK, indicates a shock command is being transmitted, while symbol 258, STMU, indicates a vibrate command is being transmitted. The inventive wireless command module includes circuitry that defines logic to generate the described display.

Figure 8:
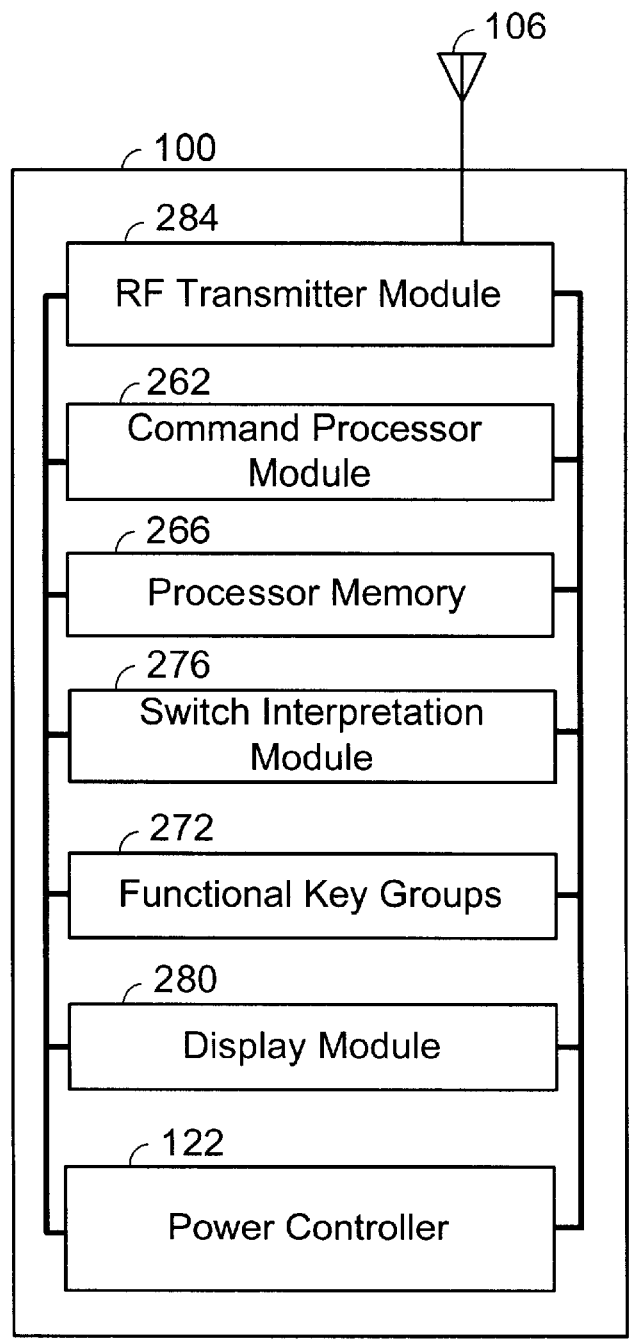
FIG. 8 is a functional schematic diagram of the wireless command module according to one embodiment of the present invention.

FIG. 8 is a functional schematic diagram of the wireless command module 100 according to one embodiment of the present invention. A power controller 122 performs the power management function as previously described. When first turned on, a command processor module 262 performs a power-on self test (POST), initializes an RF transmitter module 284, and reads the switch settings defined by a switch interpretation module 276. During POST, command processor module 262 resets an inactivity timer. This inactivity timer defines the period of time after which command processor module 262 issues a shut-down command to power controller 122. The inactivity timer is re-set each time a key is pressed.

Functional key groups 272 define three functional groups of one-touch switches to control operation of wireless command module 100. When a one-touch key is pressed, switch interpretation module 276 determines which key was pressed and then provides the information to command processor module 262. Command processor module 262 updates a display module 280 and adds the selected stimulation mode to the formatted transmission message, if required. If the key pressed was an output switch, i.e. vibrate or shock key, the formatted transmission message is provided to RF transmitter module 284 for transmission via a transmitter antenna 106. A processor memory 266 stores the command processor module process algorithm, as well as the selected operating mode and receiver address. Processor memory 266 comprises logic circuitry and EEP ROM 124, as described in FIG. 4.

Figure 9:
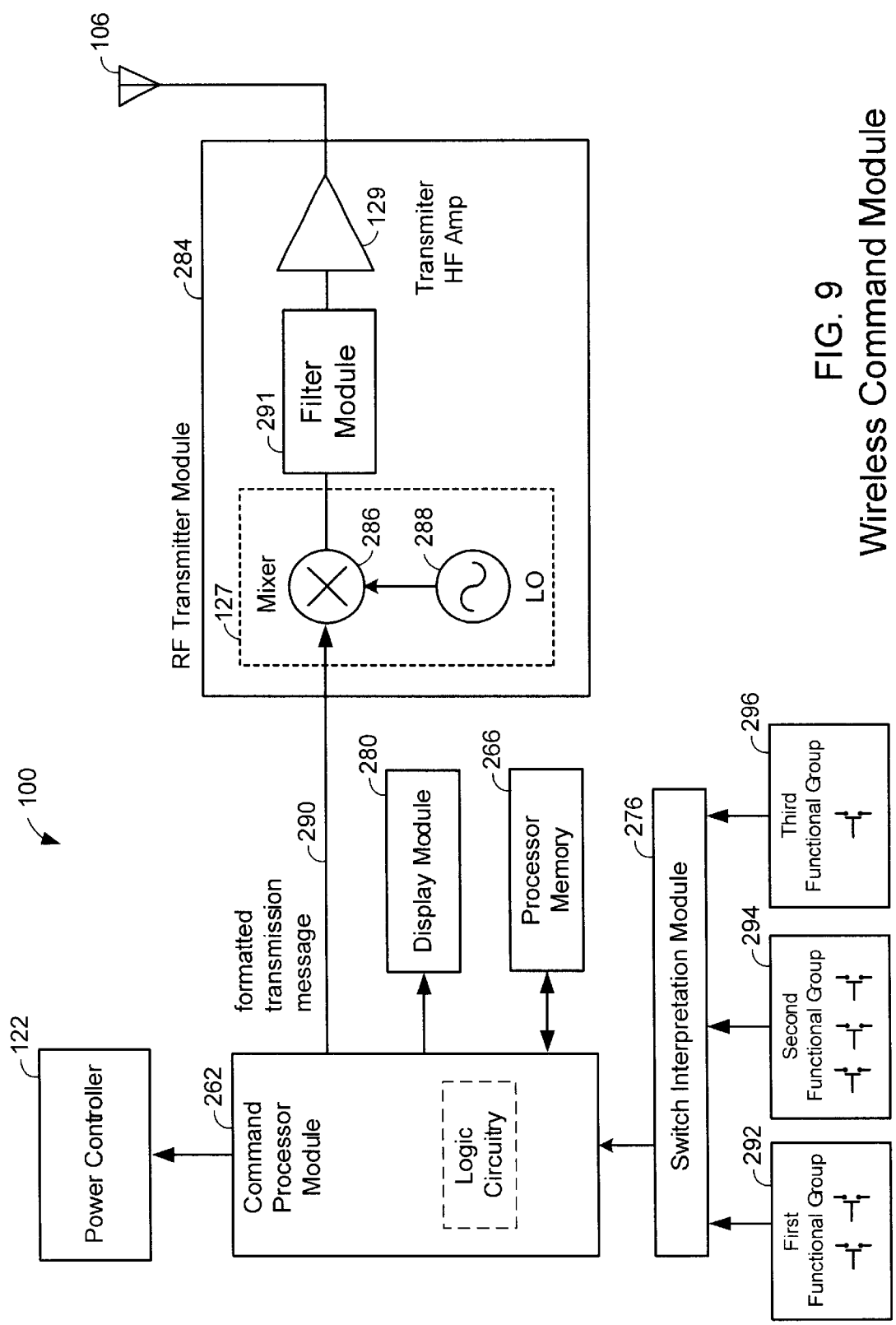
FIG. 9 is a functional schematic diagram of the wireless command module showing a detailed view of an RF transmitter module.

FIG. 9 is a functional schematic diagram of the wireless command module 100 showing a detailed view of RF transmitter module 284. Modulation part 127 comprises a mixer 286 and a local oscillator (LO) 288. Mixer 286 receives the formatted transmission message from command processor module 262 on line 290. The LO 288 frequency of oscillation, set to the desired RF carrier frequency, is coupled to mixer 286 where it is mixed to form a modulated RF signal. The modulated RF signal is provided to a filter module 291 wherein frequencies below a low corner frequency and above a high corner frequency are sharply attenuated. The filtered modulated RF signal is coupled to a high frequency (HF) amplifier 129 for transmission via transmitter antenna 106.

In wireless command module 100, switches are grouped according to function, in which a first functional group 292 comprises a plurality of switches for selecting a receiver address and for defining a plurality of addresses corresponding to the receivers in use. A second functional group 294 comprises a plurality of switches for setting the stimulation mode. A third functional group 296 comprises at least one one-touch switch for setting a stimulation intensity level. The output of each functional group is coupled to switch interpretation module 276 wherein the switch information is encoded for processing by command processor module 262. Display module 280 comprises logic circuitry and LCD 107 (not shown). Logic circuitry is for generating graphical symbols responsive to control signals received from command processor module 262. LCD 107 operates as described in FIG. 7.

Figure 10:
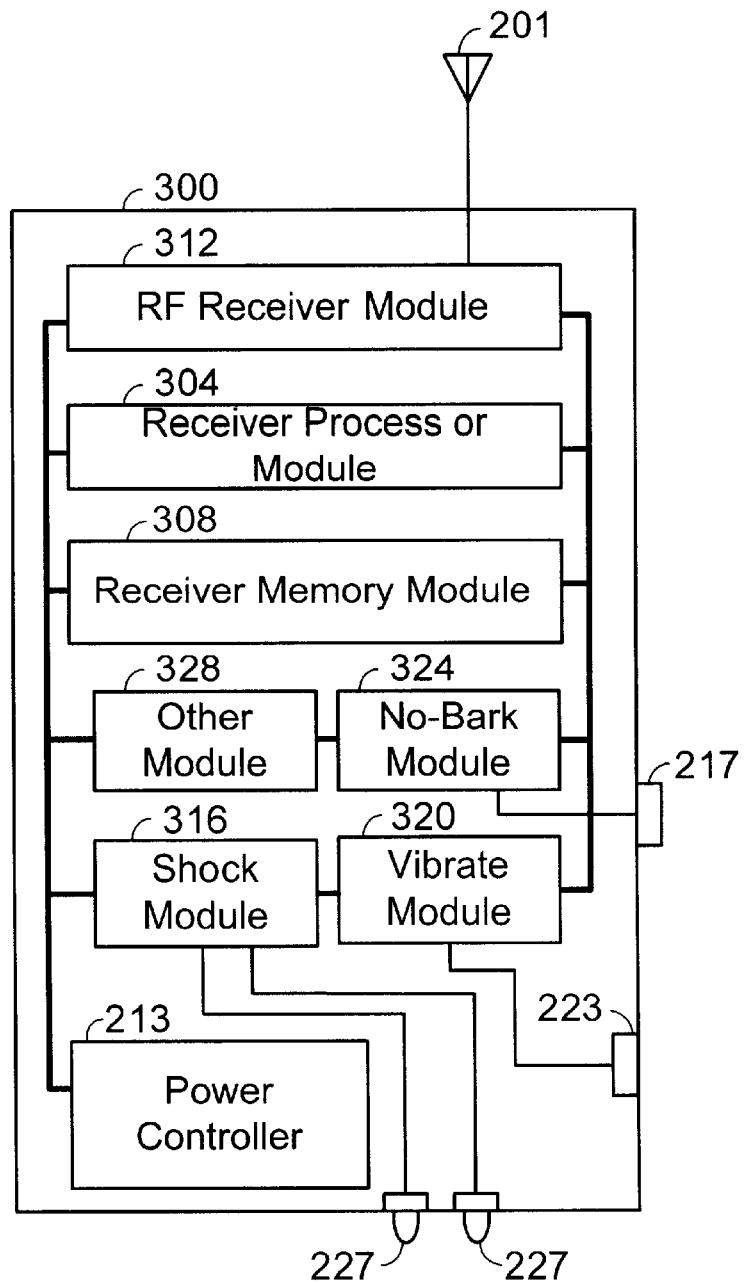
FIG. 10 is a functional schematic diagram of the wireless receiver module according to one embodiment of the present invention.

FIG. 10 is a functional schematic diagram of the wireless receiver module 300 according to one embodiment of the present invention. A power controller 213 operates as previously described in FIG. 6. A receiver processor module 304 contains logic circuitry to control operation of the wireless receiver module 300 according to program instructions stored in a receiver memory module 308. In the present embodiment, receiver memory module 308 is formed in EEP ROM external to receiver processor module 304, however, receiver memory module 308 could be formed in a variety of known formats either internal or external to receiver processor module 304. Receiver memory module 308 could also be formed in alternate embodiments such as non-volatile flash memory. Receiver processor module 304 also processes digital data, received from an RF receiver module 312 via an antenna 201, into a plurality of stimulation control signals responsive to the transmitted control commands received from the wireless command module. The stimulation control signals are provided to a shock module 316 and a vibrate module 320. Shock module 316 processes the shock control signal into a shock analog voltage sufficient to cause a shock to be generated at shock electrodes 227. Vibrate module 320 processes the vibrate control signal in a waveform sufficient to drive a vibration motor 223. In the no-bark operating mode, bark sensor 217 provides vibrations, responsive to the barking, to no-bark module 324. Upon receipt of the vibrations, no-bark module 324 processes the vibrations into a digital signal suitable for processing by receiver processor module 304 which then sends a vibrate control signal to vibrate module 320, thus preventing barking.

Other module 328 anticipates alternate embodiments that may include sonic or ultrasonic functions. Sonic functions may include programmable commands synthesized from the trainer's voice to control animal behavior. An ultrasonic function would use variable strength sound waves (higher than the human hearing range) to train the animal.

Figure 11:
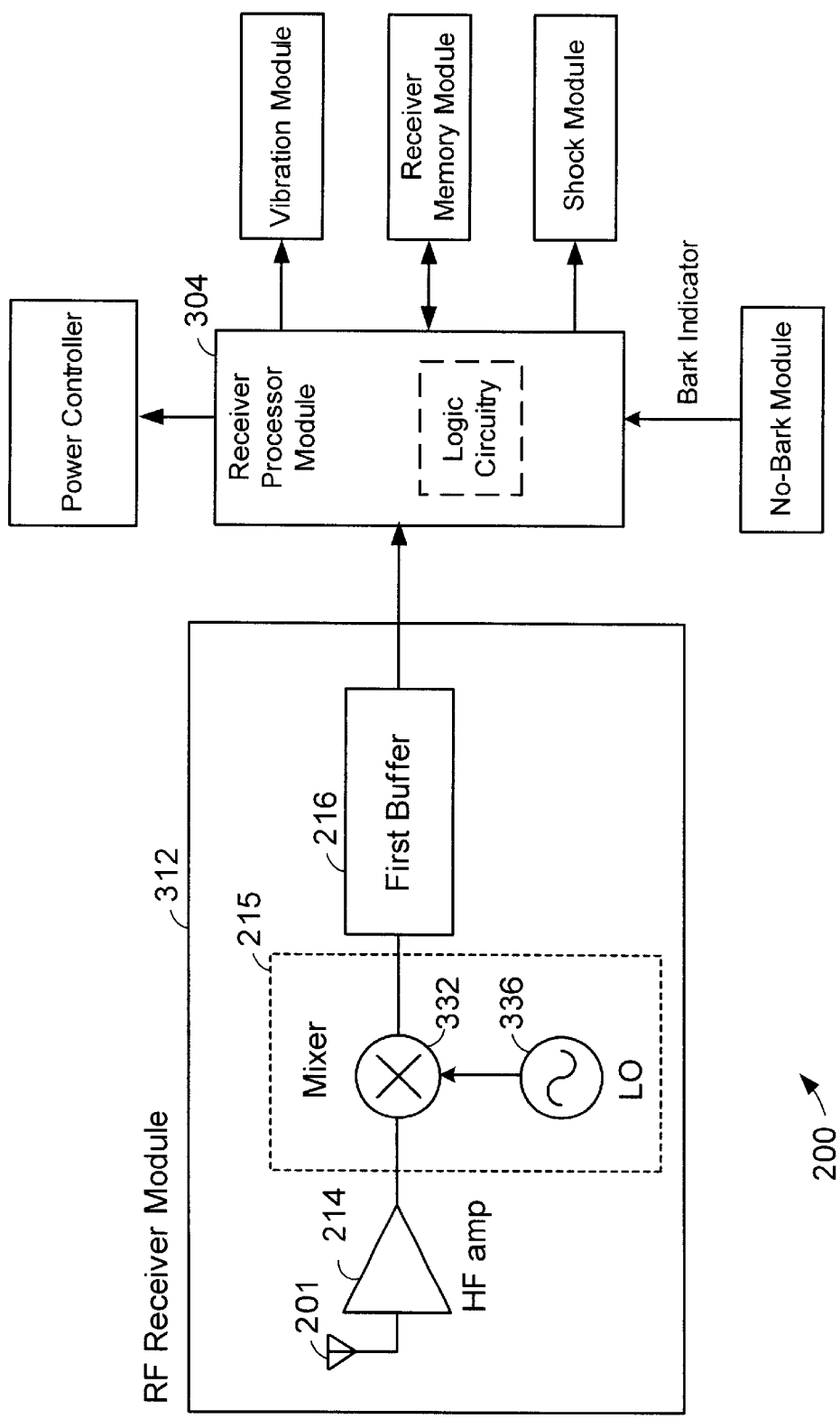
FIG. 11 is a functional schematic diagram of the wireless receiver module showing a detailed view of an RF receiver module.

FIG. 11 is a functional schematic of the wireless receiver module 200 showing a detailed view of an RF receiver module 312. The modulated RF signal is coupled to a high frequency (HF) amplifier 214 by receiving antenna 201. The modulated RF signal is amplified by a fixed gain by HF amplifier 214 and then coupled to a demodulator 215. Demodulator 215 comprises a mixer 332 and a local oscillator (LO) 336. LO 336, oscillating at the selected carrier frequency, is coupled to mixer 332 which separates the amplified modulated RF signal into the carrier frequency and the formatted transmission message. The formatted transmission message is coupled to a first buffer 216 wherein the formatted transmission message is formed into a digital signal suitable for interpretation by a receiver processor module 304.

Figure 12:
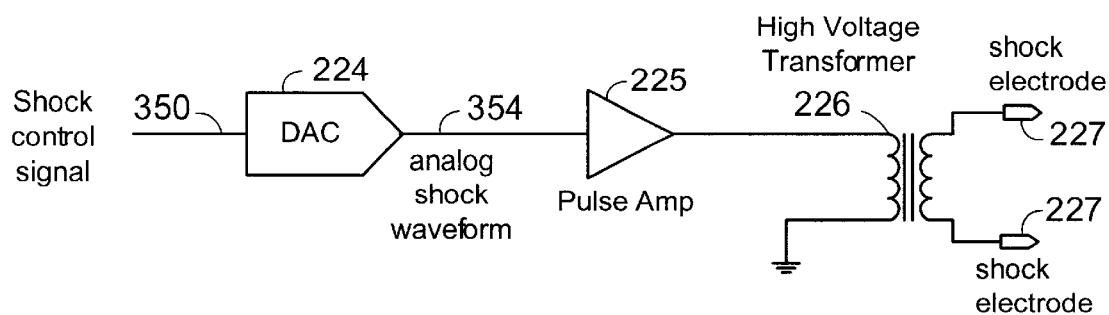
FIG. 12 is a detailed schematic diagram of a shock module.

FIG. 12 is a detailed schematic of the shock module 316 of FIG. 10. When the stimulation mode is set to shock, receiver processor 304 (not shown) provides a shock control signal by way of line 350 to a digital to analog converter (DAC). 224, which converts the digital data into an analog shock waveform. The shock analog waveform, provided to a pulse amplifier 225 by way of line 354, is amplified to a predetermined level by pulse amplifier 225 before being coupled to a high voltage transformer 226. High voltage transformer 226 boosts the shock analog waveform to a level defined by the turns ratio of the transformer. The output of high voltage transformer 226 is coupled to shock electrodes 227 which couple the shock waveform to the animal.

Figure 13:
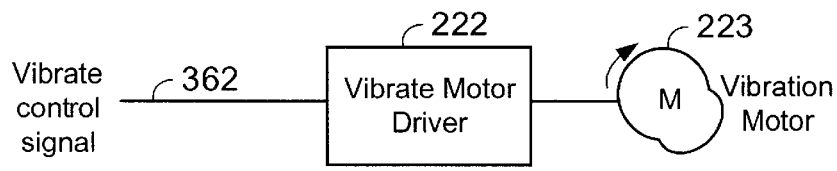
FIG. 13 is a detailed schematic diagram of a vibrate module.

FIG. 13 is a detailed schematic diagram of a vibrate module 320. When the selected stimulation mode is vibrate, receiver processor module 304 (not shown) generates a vibrate control signal to a vibration motor driver 222 by way of line 362, which converts the digital vibrate control signal into a waveform suitable for driving a vibration motor 223. As may be seen, vibration motor 223 includes a non-symmetrical shaped rotating head to generate a vibrating sensation.

Figure 14:
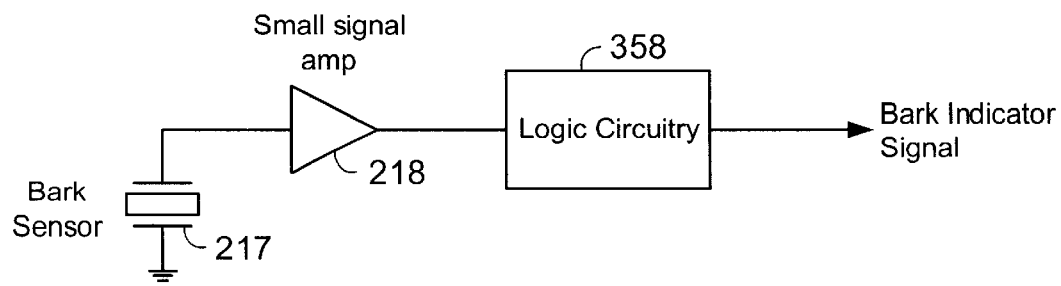
FIG. 14 is a detailed schematic diagram of a no-bark module.

FIG. 14 is a detailed schematic diagram of no-bark module 324. In the bark prevention mode, i.e. no-bark mode, a bark sensor 217 generates a small signal responsive to the barking. A small signal amplifier 218 amplifies the small signal to produce an amplified small signal that can be converted to digital data by logic circuitry 358. In the present embodiment, logic circuitry 358 forms the amplified small signal into digital data for further processing by the receiver processor module. The no-bark mode, in the present embodiment, will generate a shock at the onset of barking. In an alternate embodiment, logic circuitry 358 can be programmed to allow a moderate amount of barking but will trigger an output once the barking crosses a predetermined threshold. Once triggered, logic circuitry 358 generates a bark indicator signal that is provided to the receiver processor module for further processing. Thus, in the alternate embodiment, a barking threshold is envisioned such that a programmable level of barking is allowable but once that threshold is exceeded the receiver processor module generates a shock. In other embodiments, any selected mode and intensity level may define a training response whenever barking is detected above the specified level.

Figure 15:
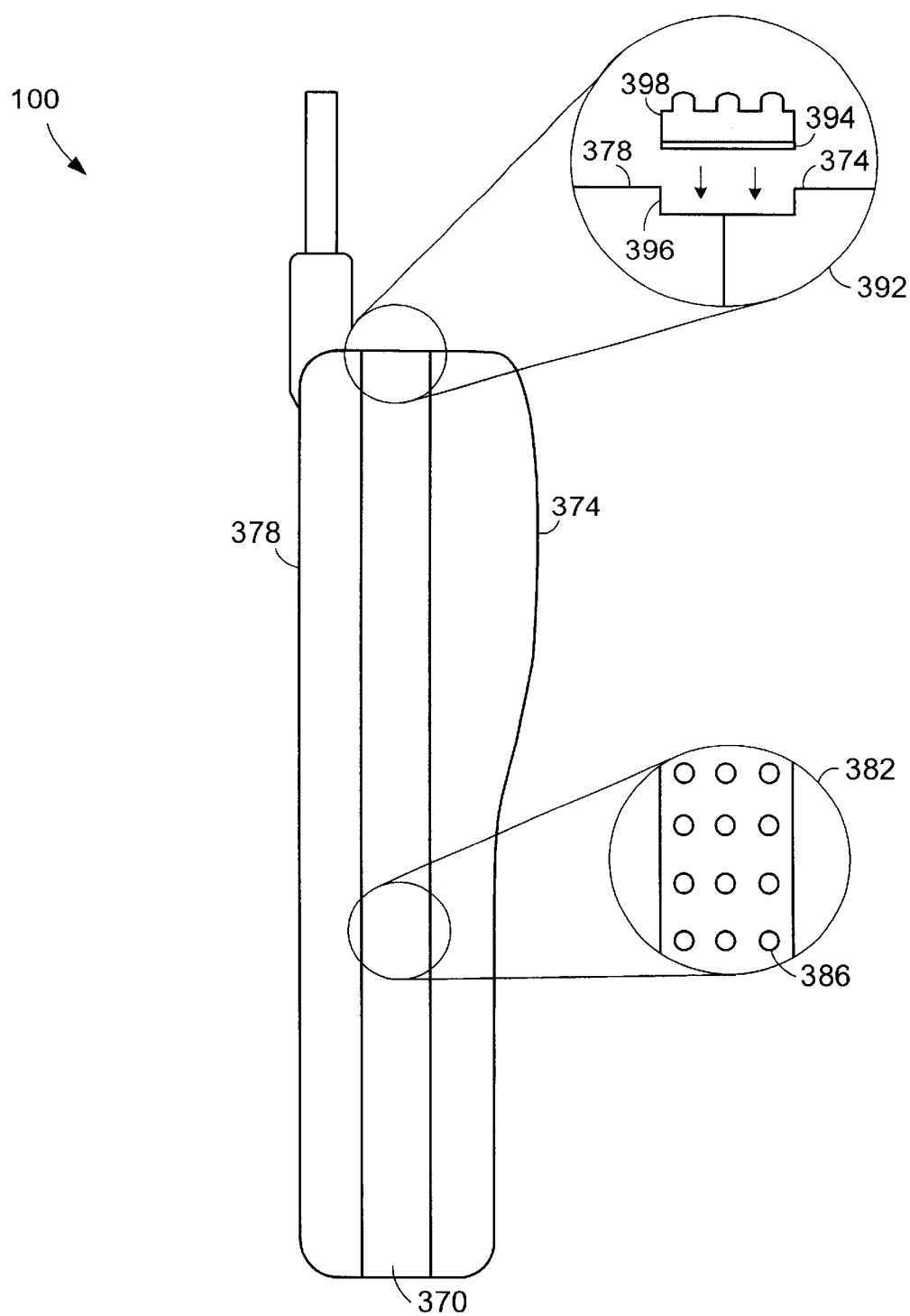
FIG. 15 is a side view of the wireless command module showing a sealing belt installed on the circumference of the wireless command module.

FIG. 15 is a side view of the wireless command module 100 showing a sealing belt 370 installed on the circumference of the wireless command module 100. Exploded view 392 illustrates a lip 396 formed by a frontal cover 374 and a rearward cover 378. The sealing belt, shown in cross-section 398, is coated with an adhesive 394 then pressed into lip 396 to form a water resistant seal. Exploded view 382 illustrates the plurality of protrusions 386 extending outwardly from the sealing belt thereby facilitating a good grip.

Figure 16A:
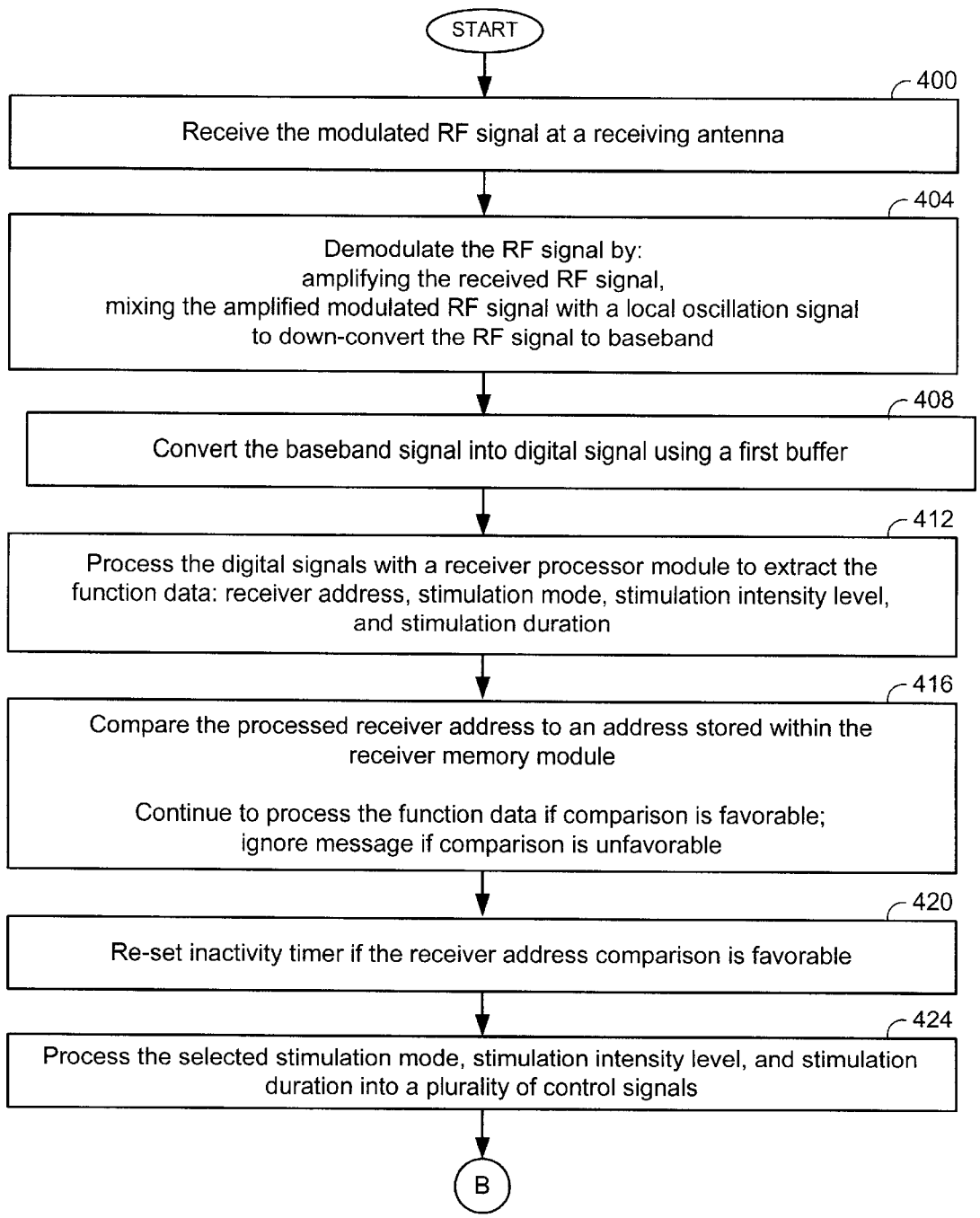
FIGS. 16a and 16b are flow charts of a receiver method.
Figure 16B:
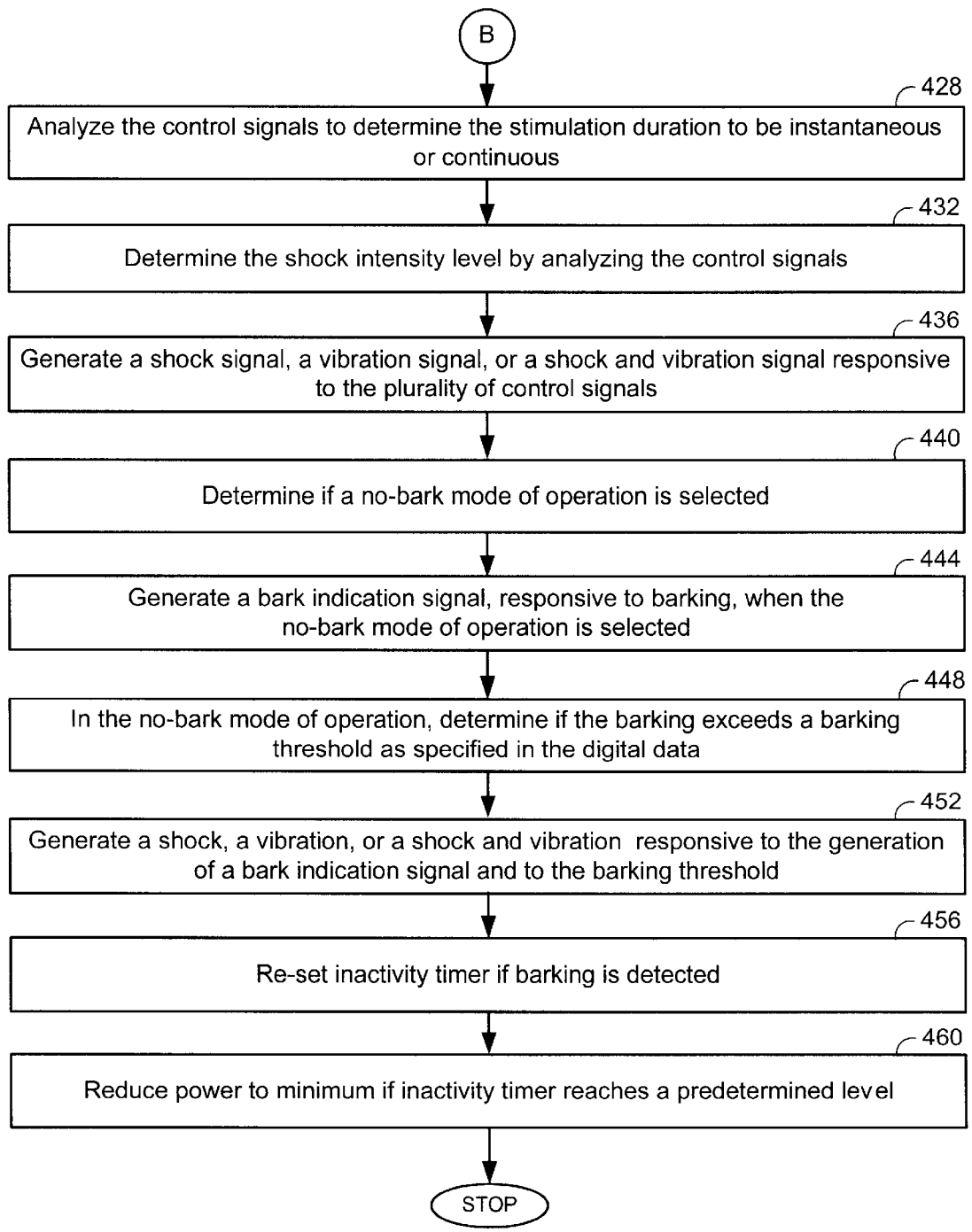

FIGS. 16a and 16b are flow charts of a receiver method. The transmitted modulated RF signal is received at a receiving antenna (step 400). The received signal is demodulated by amplifying and mixing the received RF signal with a local oscillation signal to down-convert the RF to baseband (step 404). A first buffer converts the baseband signal into digital signals suitable for processing by a receiver processor module (step 408). The receiver processor module extracts the function data (receiver address, stimulation mode, stimulation intensity level, and stimulation duration) from the digital signals (step 412). The receiver processor module compares the received receiver address to an address stored internally within the receiver memory module. If the comparison is favorable (i.e., the addresses are identical) the receiver processor module continues to process the function data. The rest of the function data is ignored if the comparison is unfavorable (step 416). An inactivity timer is re-set (set to zero) if the receiver address comparison is favorable (step 420).

After a favorable receiver address comparison, the receiver processor module continues to process the stimulation mode, stimulation intensity level, and stimulation duration to create a plurality of control signals (step 424). The plurality of control signals are coupled to a shock module, a vibration module, and a no-bark module responsive to the commands transmitted from a wireless command module. The stimulation duration is determined to be instantaneous or continuous by analyzing a duration control signal (step 428). The shock intensity level is set according to the intensity control signal processed from the function data (step 432). The stimulation modules generate a shock, a vibration, or a shock and vibration responsive to the plurality of control signals received from the receiver processor (step 436).

The receiver processor also determines that a no-bark mode of operation is selected (step 440). When selected, the no-bark module generates a bark indication signal that is coupled to the receiver processor module (step 444). In the no-bark mode of operation, the receiver processor module determines if the bark indication signal exceeds a barking threshold as specified in the digital data (step 448). If the barking exceeds the barking threshold, the receiver processor module generates a shock signal, a vibration signal, or a shock and vibration signal to the simulation modules (step 452). In the no-bark mode, the inactivity timer is re-set upon the generation of the bark indication signal (step 456). Unless re-set by an activity indicating the stimulation module is in-use, the inactivity timer will continue to count up to a predetermined maximum value at which time it will signal the receiver processor module to turn the power controller off in order to save power (step 460)

Figure 17:
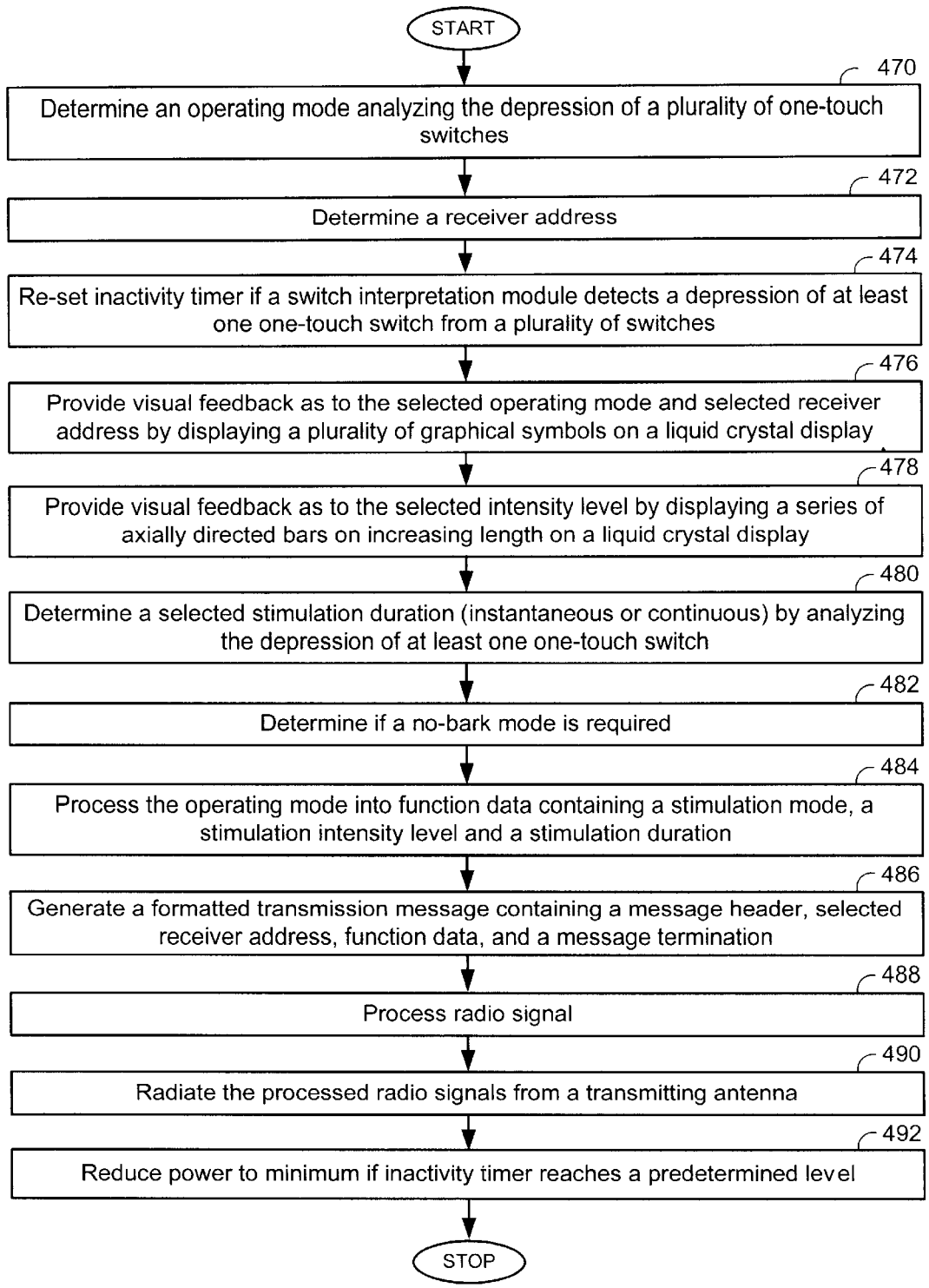
FIG. 17 is a wireless command module method flow chart.

FIG. 17 is a wireless command module method flow chart. The operating mode is determined by analyzing a plurality of one-touch switches (step 470). A receiver address is determined by analyzing the at least one one-touch switch (step 472). Each time a switch interpretation module detects a switch depression, an inactivity timer is re-set (step 474). Confirmation of the selected operating mode and receiver address is provided by displaying a plurality of graphical symbols on a liquid crystal display (step 476). The selected intensity level is shown on the liquid crystal display by displaying a series of axially directed bars of increasing length to reflect increasing intensity level (step 478).

A selected stimulation duration can be either instantaneous or continuous. The stimulation duration is determined by analyzing a plurality of one-touch switches (step 480). In the continuous mode the stimulation will continue as long as a "continuous" one-touch switch is pressed. The instantaneous mode will generate the stimulation for a predetermined period of time. An alternate training mode, a no-bark mode, provides a stimulation (shock, vibration, shock and vibration) whenever barking is detected. The no-bark mode is selected by pressing at least one one-touch switch (step 482).

The command processor module processes the selected operating modes into function data containing the selected stimulation mode, selected stimulation intensity level, and the selected stimulation duration (step 484). The command processor further processes the function data and the selected receiver address into a formatted transmission message containing a message header and a message termination (step 486). The formatted transmission message is processed into a radio signal (step 488) then transmitted for reception by the selected receiver. The method of processing the formatted transmission message into a radio signal comprises: mixing the formatted transmission message with a local oscillation signal operating at a selected RF frequency to create a modulated RF signal. The modulated RF signal is filtered by a filter module to remove signal components below and above the selected RF frequency. After amplification the processed radio signal is radiated from a transmitting antenna (step 490).

The command processor module monitors an inactivity timer that continuously increments when the command module is in an active state. Unless the inactivity timer is reset by the command processor, the inactivity will reach a predetermined level, at which time the command processor will generate a shut-down command that instructs the power controller to reduce system power to a minimum (step 492).

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A wireless animal behavior modification system, comprising:
   a wireless receiver module formed to receive a modulated radio frequency (RF) signal, including control commands over a wireless communication link, the wireless receiver module comprising:
      an RF receiver module, coupled to receive the modulated RF signal from a receiving antenna, the RF receiver module further comprising:
         a high frequency amplifier, coupled to the receiving antenna, for producing an amplified modulated RF signal;
         a demodulator coupled to receive the amplified modulated RF signal, the demodulator for extracting a formatted transmission message from the amplified modulated RF signal, the demodulator comprising a receiver mixer coupled to the high frequency amplifier and to a local oscillator operating at a selected radio frequency, and
         a first buffer, operably coupled to receive the extracted formatted transmission message from the demodulator, the first buffer for forming the extracted formatted transmission message into a digital format;
      a receiver processor module, containing logic circuitry, operably coupled to receive the formatted transmission message from the first buffer and further formed to decode the formatted transmission message into a plurality of stimulation control signals responsive to a plurality of transmitted control commands;

a receiver memory module, operably coupled to the receiver processor module, for storing the plurality of stimulation control signals and for storing a receiver processor module algorithm code; and a plurality of stimulation modules for stimulating an animal, coupled to receive the plurality of stimulation control signals from the receiver processor module, the plurality of stimulation modules for stimulating the animal with at least one of shock, vibration or shock and vibration;

an adjustable collar assembly connected to the wireless receiver module for maintaining the wireless receiver module in close proximity to an animal, the adjustable collar assembly further containing the receiving antenna integrated into the adjustable collar assembly;

a wireless command module, for transmitting the plurality of control commands via the wireless communication link, the wireless command module further including:

at least one stimulation intensity level switch for selecting an intensity level for the wireless receiver module wherein the intensity level relates to an intensity of a behavior modification stimulant;

at least one stimulation mode switch for selecting a desired operating mode;

at least one receiver select switch for selecting a wireless receiver module;

a switch interpretation module, operably coupled to the at least one stimulation intensity level switch and to the at least one receiver select switch, the switch interpretation module for determining the selected intensity level by the at least one stimulation intensity level switch and for generating a plurality of control commands that reflect the selected intensity level and the selected receiver wherein the wireless receiver module, upon receiving the plurality of control commands, sets the intensity of the behavior modification stimulant to correspond to the selected intensity level of the wireless command module if the selected receiver select switch reflects the wireless receiver module;

a command processor module, containing logic circuitry coupled to receive the plurality of control commands from the switch interpretation module, for processing the plurality of control commands into a plurality of control signals responsive to the plurality of control commands and for processing the plurality of control signals into the formatted transmission message;

a processor memory, operably coupled to the command processor module, for storing the plurality of control commands and for storing a command processor module algorithm code; and an RF transmitter module, operably coupled to receive the formatted transmission message from the command processor module, for up-converting the formatted transmission message into a modulated RF signal suitable for wireless communications, the RF transmitter module further comprising:

a local oscillator operating at a selected radio frequency (RF);

a mixer, operably coupled to the command processor module and to the local oscillator, for mixing the formatted transmission message from the command processor module with the selected RF in order to produce the modulated RF signal;

a filter module, operably coupled to the mixer, formed to remove signals below a lower corner frequency or above an upper corner frequency, the filter module producing a filtered RF signal; and a high frequency amplifier, operably coupled to receive the filtered RF signal from the filter module, the high frequency amplifier for amplifying the modulated RF signal to produce an amplified and filtered RF signal to a transmitting antenna for transmission.

2. The wireless animal behavior modification system of claim 1, wherein the plurality of stimulation modules further comprise a no-bark module, operably coupled to the receiver processor module, the no-bark module for detecting vocal cord vibrations and providing a bark indicator signal to the receiver processor module which then generates at least one stimulation control signal according to the stored stimulation control signals, the no-bark module further comprising:

a bark sensor for generating a small signal responsive to the vibrations;

a small signal amplifier for amplifying the small signal received from the bark sensor; and logic circuitry, operably coupled between the small signal amplifier and the receiver processor module, for generating the bark indicator signal responsive to receiving an amplified small signal output from the small signal amplifier.

3. The wireless animal behavior modification system of claim 1, wherein the command processor module further comprises a plurality of one-touch switches (momentary contact switches) formed into functional groups for controlling operation of the wireless animal behavior modifications system, the plurality of one-touch switches coupled to produce outputs to the switch interpretation module.

4. The wireless animal behavior modification system of claim 3, wherein a first functional group comprises at least one one-touch switch formed as the receiver select switch for selecting a specific wireless receiver module from a plurality of wireless receiver modules, the at least one receiver select switch coupled to produce an address output to the switch interpretation module.

5. The wireless animal behavior modification system of claim 3, wherein a second functional group comprises a plurality of one-touch switches, operably coupled to the switch interpretation module, for setting a stimulation mode.

6. The wireless animal behavior modification system of claim 5, wherein the plurality of one-touch switches of the second functional group includes a first one-touch switch for setting the stimulation mode to a vibrate only mode of operation.

7. The wireless animal behavior modification system of claim 6 wherein the plurality of one-touch switches of the second functional group includes a second one-touch switch for setting the stimulation mode to a shock (nick) only mode of operation.

8. The wireless animal behavior modification system of claim 7, wherein the plurality of one-touch switches of the second functional group includes a third one-touch switch for setting the stimulation mode to a nick and vibrate mode of operation.

9. The wireless animal behavior modification system of claim 8, wherein the plurality of one-touch switches of the second functional group includes a fourth one-touch switch for setting the stimulation mode to an instantaneous output.

10. The wireless animal behavior modification system of claim 9, wherein the instantaneous output is for a preset period of time.

11. The wireless animal behavior modification system of claim 10, wherein the preset period of time is selectable.

12. The wireless animal behavior modification system of claim 11, wherein the selected period of time is approximately 0.4 seconds.

13. The wireless animal behavior modification system of claim 9, wherein the plurality of one-touch switches of the second functional group includes a fifth one-touch switch for setting the stimulation mode to a continuous output for as long as the fifth one-touch switch is pressed.

14. The wireless animal behavior modification system of claim 3, wherein a third functional group comprises at least one one-touch switch for setting a stimulation intensity level, the at least one one-touch switch operably coupled to the switch interpretation module.

15. The wireless animal behavior modification system of claim 1, wherein the wireless command module further comprises a display module, operably coupled to receive the plurality of control signals from the command processor module, the display module for generating a graphical illustration that reflects the selected intensity level and selected operating modes, the display module further comprising:
   a plurality of graphical symbols for indicating the selected operating modes;
   at least one transmission status symbol for temporarily indicating a transmission of data;
   a battery status symbol for indicating a remaining power level; and
   at least one bar graph display for indicating a selected intensity level responsive to the plurality of control commands received from the switch interpretation module via the command processor module.

16. The wireless animal behavior modification system of claim 15, wherein the wireless command module further comprises a power controller module, operably coupled to the command processor module, to provide a system power and perform a power management function, the power management function defining logic to place the wireless command module into a reduced power mode after a period of time has elapsed.

17. The wireless animal behavior modification system of claim 1, wherein the plurality of stimulation modules, further comprises:
   a vibrate module, coupled to receive at least one vibrate control signal from the plurality of stimulation control signals, further comprising:
      a vibration motor, coupled to the adjustable collar assembly, for generating vibrations; and
      a vibration motor driver, coupled to receive the at least one vibrate control signal, for converting the at least one vibrate control signal into a motor control signal suitable for driving the vibration motor, the motor control signal operably coupled to the vibration motor;
   a shock module, coupled to receive at least one shock control signal from the plurality of stimulation control signals, the shock module further comprising:
      a digital to analog converter (DAC) for converting the at least one shock control signal into a shock analog waveform responsive to the plurality of stimulation control signals received from the command processor module;
      a pulse amplifier, coupled to receive the shock analog waveform, the pulse amplifier for amplifying the shock analog waveform to a predetermined level;
      a high voltage transformer, coupled to receive the amplified shock analog waveform, for generating a high voltage sufficient to cause a shock; and
      a least one shock electrode, coupled to receive the high voltage from the high voltage transformer, the at least one shock electrode for conducting the high voltage to the animal.

18. The wireless animal behavior modification system of claim 1, wherein the wireless receiver module further comprising:
   an RF receiver module for receiving an RF signal and demodulating the RF signal into a data signal containing control commands;
   a receiver processor module for generating at least one vibrate control signal and at least one shock control signal to activate at least one of a vibrate module, a shock module, or a vibrate and shock module, the receiver processor module coupled to receive a demodulated data signal from the RF receiver module and further coupled to receive a bark indicator signal;
   a vibrate module for generating vibrations responsive to the at least one vibrate control signal received from the receiver processor module;
   a shock module for generating a shock signal responsive to the at least one shock control signal received from the receiver processor module;
   a no-bark module for detecting barking and, responsive thereto, for generating the bark indicator signal; and
   a receiver power control module to provide a system power and perform a power management function, the power management function defining logic to place the wireless receiver module into a reduced power mode after a period of time has elapsed.

19. The wireless receiver module of claim 18, wherein the no-bark module detects the animal's vocal cord vibrations and provides the bark indicator signal to the receiver processor module, wherein the receiver processor module generates at least one stimulation control signal according to the stored stimulation control signals, the no-bark module further comprising:
   a bark sensor for generating a small signal responsive to the vibrations;
   a small signal amplifier for amplifying the small signal received from the bark sensor; and
   logic circuitry, operably coupled between the small signal amplifier and the receiver processor module, for generating the bark indicator signal responsive to receiving an amplified small signal output from the small signal amplifier.

20. The wireless receiver module of claim 18, wherein the vibrate module, coupled to receive the at least one vibrate control signal from the receiver processor module, further includes:
   a vibration motor, coupled to an adjustable collar assembly, for generating vibrations; and
   a vibration motor driver, coupled to receive the at least one vibrate control signal, for converting the at least one vibrate control signal into a motor control signal suitable for driving the vibration motor, the motor control signal operably coupled to the vibration motor.

21. The wireless receiver module of claim 18, wherein the shock module, coupled to receive the at least one shock control signal from the receiver processor module, the shock module further comprising:
   a digital to analog converter (DAC) for converting the at least one shock control signal into a shock analog waveform;

a pulse amplifier, coupled to receive the shock analog waveform, the pulse amplifier for amplifying the shock analog waveform to a predetermined level;

a high voltage transformer, coupled to receive the amplified shock analog waveform, for generating a high voltage sufficient to cause a shock; and a least one shock electrode, coupled to receive the high voltage from the high voltage transformer, the at least one shock electrode for conducting the high voltage to the animal.

22. The wireless receiver module of claim 18, wherein the RF receiver module further comprises:

a receiving antenna for receiving the modulated RF signal;

a high frequency amplifier, coupled to the receiving antenna, formed to amplify the received modulated RF signal;

a demodulator for extracting a formatted transmission message from the amplified modulated RF signal, the demodulator comprising a receiver mixer coupled to the high frequency amplifier and to a local oscillator operating at a selected radio frequency (RF); and a first buffer, operably coupled to receive the extracted formatted transmission message from the demodulator, for forming the formatted transmission message into a digital data signal suitable for interpretation by the receiver processor module.

23. The wireless receiver module of claim 18, wherein the receiver processor module, containing logic circuitry, operably coupled to receive the digital data signal from the first buffer and further formed to decode the digital data signal into a plurality of stimulation control signals responsive to a plurality of transmitted control commands.

24. The wireless receiver module of claim 18 further comprising a receiver memory module, operably coupled to the receiver processor module, for storing the received plurality of stimulation control signals and for storing a receiver processor module algorithm.

* * * * *